United States Patent [19]
Ching

[11] Patent Number: 5,233,785
[45] Date of Patent: Aug. 10, 1993

[54] FISHING LURE WITH INTERSECTING BORES

[76] Inventor: Edwin K. W. Ching, Tamuning, Guam

[21] Appl. No.: 885,315

[22] Filed: May 18, 1992

[51] Int. Cl.$^5$ .................... A01K 85/00; A01K 85/16
[52] U.S. Cl. .................................. 43/42.05; 43/42.36
[58] Field of Search ............ 43/42.05, 42/36, 42/08, 43/42/04, 36; D22/133

[56] References Cited

U.S. PATENT DOCUMENTS

| | | | |
|---|---|---|---|
| 1,390,458 | 9/1921 | Moree | 43/42.05 |
| 2,283,960 | 5/1942 | Wade | 43/42.04 |
| 2,373,417 | 4/1945 | Rosegard | 43/42.05 |
| 2,547,469 | 4/1951 | Husson | 43/42.36 |
| 2,986,838 | 6/1961 | Smyser | 43/42.36 |
| 3,803,749 | 4/1974 | Boyum | 43/44.9 |
| 4,086,719 | 5/1978 | Robbins | 43/44.9 |
| 4,138,795 | 2/1979 | Welle | 43/44.89 |
| 4,528,771 | 7/1985 | Rea, Jr. | 43/44.9 |
| 4,672,766 | 6/1987 | Mattison | 43/17.6 |

*Primary Examiner*—Kurt C. Rowan
*Assistant Examiner*—Jeanne M. Elpel
*Attorney, Agent, or Firm*—Seed and Berry

[57] ABSTRACT

A fishing lure having a lure body with a main bore and a mid-portion bore. The main bore extends longitudinally through the body between its front and rear ends and the mid-portion bore branches from the main bore and extends to a lower side of the lure body. A first line portion passes through the main bore and terminates in a rear attachment loop located outward of the body to which a rear hook is attached. A second line portion passes through a forward portion of the main bore and the mid-portion bore and terminates in a side attachment loop located outward of the body to which a side hook is attached. The first and second line portions are connected together outward of the body at its forward end to form a fishing line attachment loop to which a fishing line may be coupled. The body slides freely on the first and second line portions so that when a fish strikes the lure, the body slides forward along the first and second line portions to leave a space between the hooks and the body, and the force the fisherman applies to the fishing line is transmitted directly to the hooks and not indirectly by way of the body.

29 Claims, 4 Drawing Sheets

FISHING LURE WITH INTERSECTING BORES

DESCRIPTION

1. Technical Field

The present invention relates generally to fishing equipment, and more particularly, to fishing lures.

2. Background of the Invention

The need for maximizing the ability of a fishing lure to attract and hook fish has long been recognized. Many attempts have been made to position hooks strategically about a lure in places where fish are apt to strike so that the chances for hooking a fish are increased.

Most fishing lures are hard and made of wood, plastic, or metal with the hooks secured directly to the lure body. The lure itself may prevent the fish from actually biting the hook or the lure may be used as a lever by the fish to help dislodge the hook from its mouth. Further, most traditional lures require the line to be tied directly to the lure body. When a fisherman attempts to set the hook with a hard jerk, the lure is often pulled out of the fish's mouth. This problem is particularly acute when the fish strikes a hook located toward the center portion of the lure body, as opposed to a hook positioned at a rearward end of the lure body.

Attempts have also been made to provide a lure that will slide on the fishing line away from the fish as the fish strikes the lure. Although some prior fishing lures allow the lure to slide back and forth on the fishing line, only a single hook located at an extreme end of the lure is secured to the fishing line. However, many lures have more than one hook. Usually, one is located at a rearward end of the lure body tied to the fishing line, and one or more secured to the lure body along a mid-portion of the body. Fish often strike the center portion of the lure as opposed to simply the end of the lure and in such a case, will not touch the rear hook secured to the fishing line.

Another problem with respect to traditional lures where the fishing line is tied to the lure body is that a delay results in setting the hook because the jerking action the fisherman uses to set the hook is applied to the lure body and the applied setting force must be transmitted through the lure body to the hook. The lure body, effectively, becomes an obstacle to quickly transmitting the applied setting force to the hook.

It will therefore be appreciated that a need exists for a fishing lure that allows the lure to slide out of the way when a fish strikes the lure, regardless of the location of the hook the fish is striking. There is also a need to provide a lure that will not allow the fish to pry any of the hooks out of its mouth by using the lure body as a lever. Finally, there is a need for a fishing lure that will better enable a fisherman to set the hook in the mouth of a fish by reducing the effect of the weight and position of the lure body on the fishing line. The present invention fulfills these needs, and further provides other related advantages.

SUMMARY OF THE INVENTION

The present invention resides in a fishing lure for use with a fishing line. The lure includes an elongated lure body having a side portion, a forward end portion and a rearward end portion. A main bore extends longitudinally fully through the lure body between the forward and rearward body end portions. The main bore has a forward bore portion and a rearward bore portion. The forward bore portion has a forward opening at the forward body end portion, and the rearward bore portion has a rearward opening at the rearward body end portion.

The lure further includes a mid-portion bore intersecting with the main bore at the junction of the forward and rearward bore portions. The mid-portion bore has a side opening at the side portion of the lure body.

A first elongated member, preferably a flexible line portion, is disposed in the main bore and extends forward out of the forward opening and rearward out of the rearward opening. A second elongated member, preferably a flexible line portion, is disposed in the forward bore portion of the main bore and the mid-portion bore, and extends forward out of the forward opening and out of the side opening. The main bore is interiorly sized to permit the body to freely slide on the first line portion therein. Similarly, the mid-portion bore is interiorly sized to permit the lure body to freely slide on the second line portion therein. The forward bore portion is interiorly sized to permit the lure body to freely slide on both the first and second line portions therein.

A rear connector portion is provided to which is attached an end portion of the first line portion extending out of the rearward opening. Similarly, a side connector portion is provided to which is attached an end portion of the second line portion extending out of the side opening. A rear hook is connected to the rear connector portion at a position outward of the lure body, and a side hook is connected to the side connector portion at a position outward of the lure body.

A front connector portion is provided to which are attached the end portions of the first and second line portions extending out of the forward opening. The front connector portion is connectable to the fishing line such that movement of the fishing line applies a force directly to the rear and side hooks through the first and second line portions without being transmitted indirectly by way of the lure body. The line body is easily slideable forward on the first and second line portions when a fish strikes the lure. With the present invention, the ability to set the rear and side hooks is enhanced and the lure body slides forward on the first and second line portions toward the front connector portion and away from the fish to prevent the fish from grasping the lure body.

In a preferred embodiment of the invention, the rear connector portion comprises a terminal end portion of the first line portion formed into a loop, and the side connector portion comprises a terminal end portion of the second line portion formed into a loop. Further, the first and second line portions comprise a continuous length of line doubled back on itself to form a loop comprising the front connector portion. The loops are held in place by crimped clasps. The forward opening, rearward opening and side opening are sized smaller than the clasps holding the loops in place to limit the forward and rearward movement of the lure body on the first and second line portions.

In one embodiment, the main bore extends straight between the forward and rearward body end portions. Also, the mid-portion bore portion diverges rearwardly from the rearward bore portion, with a divergence angle therebetween of no greater than 55 degrees.

In some alternative embodiments, the forward end portion includes a diving surface and the forward opening is located at the upper side of the lure body. In one embodiment, the rearward bore portion extends longitudinally within the lure body while the forward bore portion is angled upward relative thereto. In another embodiment, the main bore is angularly offset from the longitudinal axis of the lure body.

In yet other embodiments, the main bore is separate from the mid-portion bore and both extend from the body forward end portion. In these embodiments, the first flexible line is disposed in the main bore and the second flexible line is disposed in the mid-portion bore. In certain embodiments, one or both of the main bore and the mid-portion bore are curved along their length. In some embodiments, the main bore and mid-portion bore are formed by tubes positioned interior of the lure body.

The aforementioned rear and side hooks can be manufactured with the lure or attached by the fisherman at a later date.

Other features and advantages of the invention will become apparent from the following detailed description, taken in conjunction with the accompanying drawings.

DETAILED DESCRIPTION OF THE INVENTION

As shown in the drawings for purposes of illustration, the present invention is embodied in a fishing lure, indicated generally by the reference numeral 20. The lure 20 has an elongated lure body 22, with a generally fish-like shape. The lure body 22 may be made of wood, plastic, metal or any other suitable material.

Figure 5:
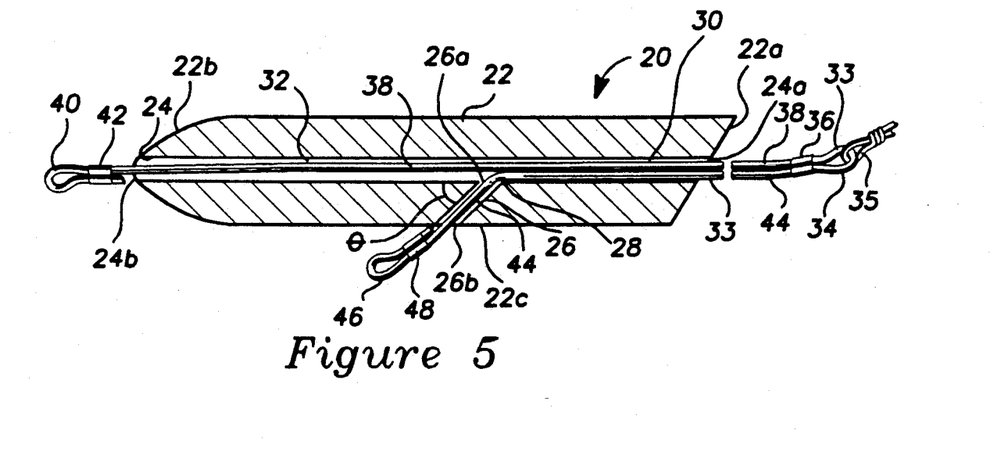
FIG. 5 is an enlarged sectional side elevation view of the lure taken along the line 5—5 of FIG. 1.

As shown in FIG. 5, the lure body 22 includes a straight main bore 24 which passes through the entire length of the lure body along its longitudinal axis. The main bore 24 has a forward opening 24a at a forward end portion 22a of the lure body 22, and a rearward opening 24b at a rearward end portion 22b of the lure body. The lure body 22 also includes a mid-portion bore 26 which passes through a mid-portion of the lure body 22 and communicates with main bore 24. The mid-portion bore 26 has an upper opening 26a at the intersection of the mid-portion bore with the main bore 24, and a lower opening 26b at a lower side portion 22c of the lure body 22 located about midway between the forward and rearward ends 22a and 22b of the lure body. The mid-portion bore 26 and main bore 24 provide a Y-shaped passageway when viewed from the side as shown in FIG. 5.

In the embodiment of FIG. 5, the mid-portion bore 26 is straight and forms a divergence angle $\theta$ with the main bore 24 of approximately 45° measured from the horizontal. The mid-portion bore 26 diverges from the main bore 24c and produces a corner 28 at their intersection over which line must slide as will be described below. Although other angles may be used for the mid-portion bore 26, it is preferable to maintain a divergence angle $\theta$ at approximately 55° or less to allow the lure body 22 to slide on the line which will be described below without undue resistance.

The main bore 24 includes a forward bore portion 30 extending between the intersection of the mid-portion bore 26 with the main bore and the forward end portion 22a of the lure body 22, and a rearward bore portion 32 extending between the intersection of the mid-portion bore with the main bore and the rearward end portion 22b of the lure body. The forward and rearward bore portions 30 and 32 are straight and in coaxial alignment For reasons which will become apparent, the forward bore portion 30 is circular in cross-section and has an interior diameter large enough to allow two heavy gauge monofilament lines or wires in side-by-side arrangement to slide freely therein, depending on whether monofilament line or wire is used. The rearward bore portion 32 is circular in cross-section and need only have an interior diameter large enough to allow a single monofilament line or a wire to slide freely therein. For ease of manufacture, the forward and rearward bore portions 30 and 32 are shown in FIG. 5 with the same diameter, since they are formed by drilling a single straight longitudinal bore through the lure body 22. The mid-portion bore 26 is circular in cross-section and has an interior diameter large enough to allow a single monofilament line or a wire to slide freely therein. Although the drawings show only a single mid-portion bore 26 for simplicity, it is to be understood that multiple mid-portion bores may be used depending on the number of side hooks desired for the lure 20.

Referring to FIGS. 1-5, the lure 20 includes a length of flexible line 33, such as heavy gauge monofilament nylon or wire, doubled back to form a line attachment loop 34 for coupling to one end of a fishing line 35 (shown in FIG. 5) which is secured at the opposite end to a fishing pole reel or a boat, or is simply handheld. The line attachment loop 34 is secured using a crimped clasp 36. The flexible line 33 includes a first line portion 38 extending from the fishing line attachment loop 34 to a free end at which a rear hook attachment loop 40 is formed using a crimped clasp 42, and a second line portion 44 extending from the line attachment loop to a free end at which a side hook attachment loop 46 is formed using a crimped clasp 48. The first line portion 38 extends within the full length of the main bore 24, passing through the forward and rearward openings 24a and 24b of the main bore. The second line portion 44 extends within the forward bore portion 30 of the main bore 24 and the mid-portion bore 26, passing through the forward opening 24a of the main bore, the upper opening 26a of the mid-portion bore and the lower opening 26b of the mid-portion bore.

Figure 1:
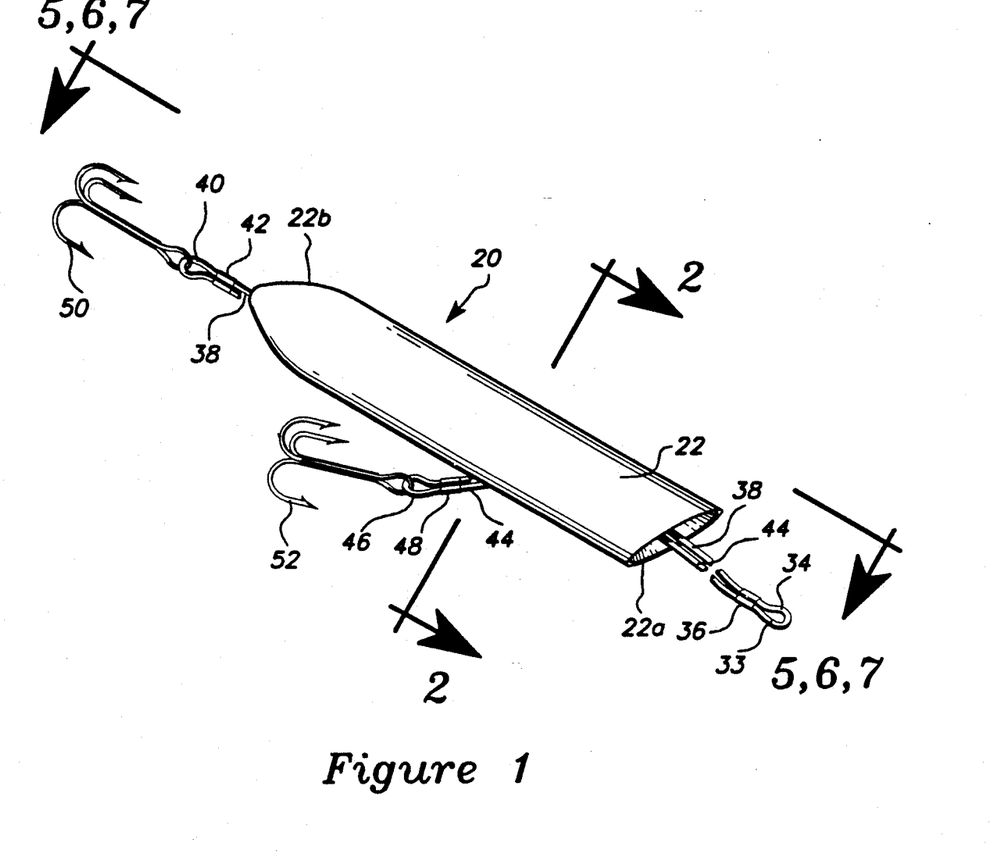
FIG. 1 is an isometric view of a fishing lure embodying the present invention.
Figure 2:
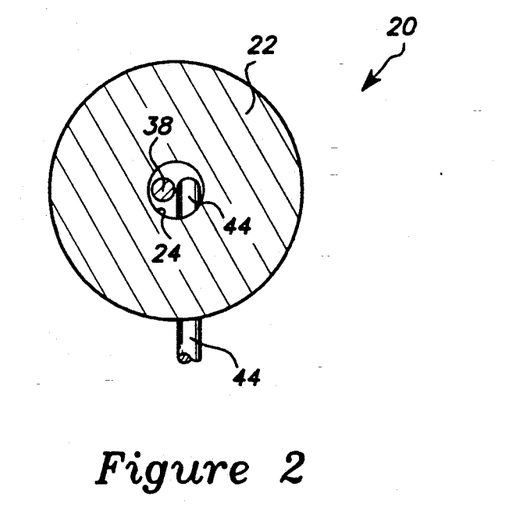
FIG. 2 is an enlarged sectional view, taken along the line 2—2 of FIG. 1

The rear hook attachment loop 40 and the side hook attachment loop 46 are formed by doubling the rearward end portion of the first line portion 38 and the second line portion 44, respectively, back onto themselves. The loops are secured in place using crimped clamps 42 and 48. As shown in FIG. 1, rear hook 50 and a side hook 52 are secured to the loops 40 and 46, respectively.

As will be described in more detail below, the main bore 24 and the mid-portion bore 26 are sized with an interior diameter to allow the lure body 22 to slide freely forward and rearward on the first and second line portions 38 and 44. The forward travel of the lure body 22 is limited by its engagement with the clasp 36 of the line attachment loop 34 which is larger in size than the forward opening 24a of the main bore 24. The rearward travel of the lure body 22 is limited by its engagement with either the clasp 42 of the rear hook attachment loop 40 or the clasp 48 of the side hook attachment loop 46, depending on which is engaged first. The claps 42 and 48 are larger in size than the rearward opening 24b of the main bore 24 and the lower opening 26b of the mid-portion bore 26, respectively.

The line attachment loop 34 allows the rear hook 50 secured to the rear hook attachment loop 40 and the side hook 42 secured to the side hook attachment loop 46 to be directly connected to the fishing line 35 coupled to line attachment loop 34. This provides a direct transmission of the force applied on the fishing line 35 by the fisherman moving his fishing pole to both the rear and side hooks 50 and 52 without transmitting the force indirectly by way of the lure body 22, thereby better enabling the fisherman to set the hooks with a quick jerk of the fishing pole. Further, the main bore 24 and mid-portion bore 26 allow the lure body 22 to slide out of the way when a fish strikes the lure 20, whether it be at the rear hook 50 (i.e., when a fish strikes from behind) or at the side hook 52 (i.e., when a fish strikes from the side), to prevent the fish from using the lure body as a lever to pry either hook out of its mouth or as a weight which helps rip the hook free. Unlike with prior art lures, the lure 20 of the present invention will not become an obstacle for the fish becoming hooked.

Figure 3:
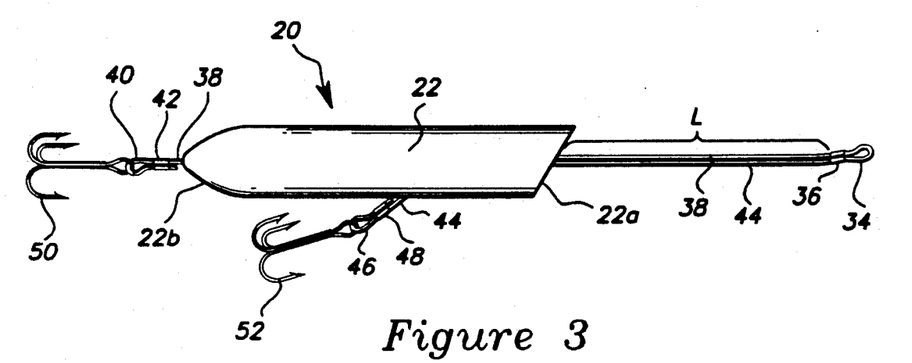
FIG. 3 is a reduced scale side elevational view of the fishing lure of FIG. 1.
Figure 4:
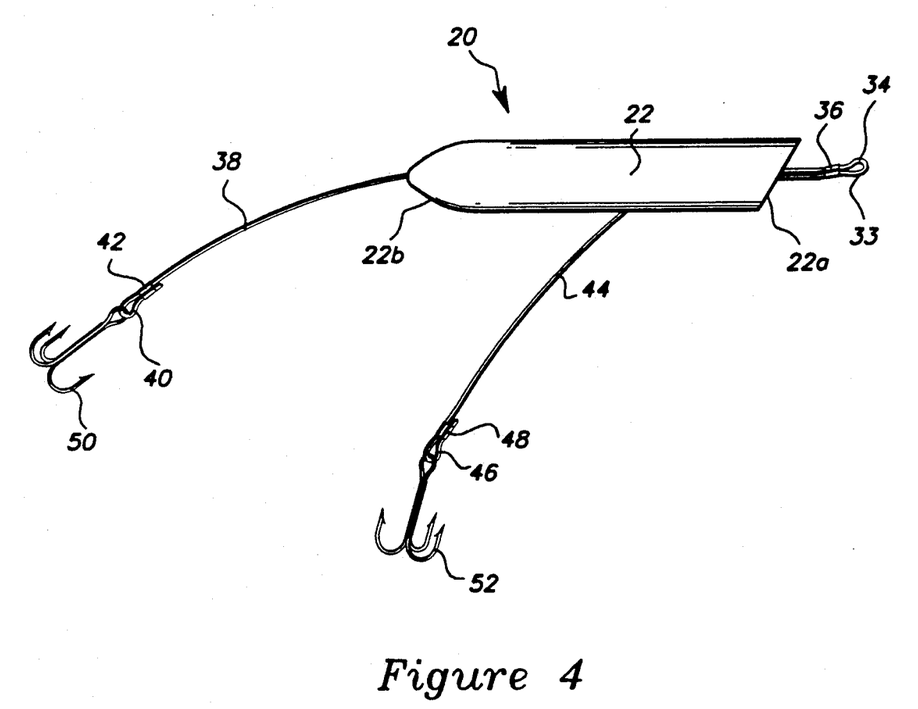
FIG. 4 is a reduced scale side elevational view of the fishing lure of FIG. 1, showing the lure body moved forward on the lure lines.

The length of first and second line portions 38 and 44 determines the distance that the lure body 22 will slide away from the rear and side hooks 50 and 52 when a fish strikes at the lure 20. In FIG. 3, the lure body 22 is shown in the position it will assume when pulled through the water to attract fish as a result of the force the water applies on the lure body. In FIG. 4, the lure body 22 is shown moved almost completely forward away from both the rear hook 50 and the side hook 52 as will occur when a fish strikes the lure 20 and pushes the lure body 22 forward. This occurs when a fish has struck the lure body 22 either at the rear hook 50 or at the side hook 52.

Figure 6:
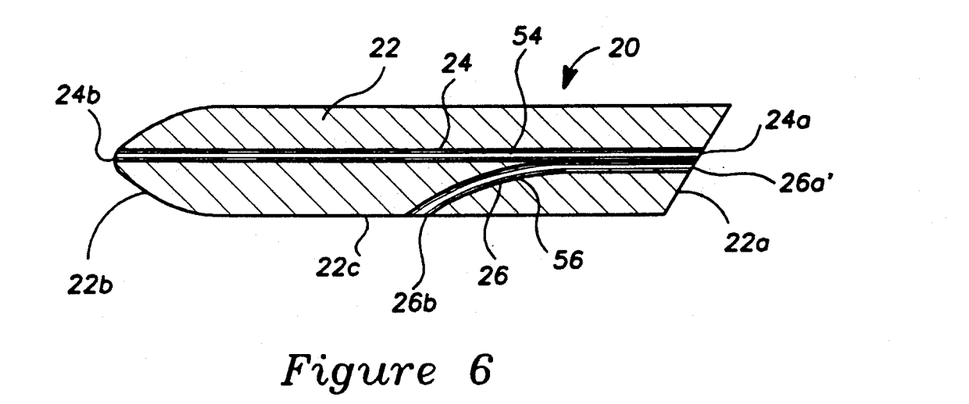
FIG. 6 is a sectional side elevation view of a first alternative embodiment of the lure of FIG. 1.

As shown in FIG. 6, in a first alternative embodiment of the invention, the main more 24 and a mid-portion bore 26 are entirely separated, with the mid-portion bore 26 extending between the lower opening 26b and a forward opening 26a' at the forward end portion 22a of the lure body 22. Only the first line portion 38 extends through the main bore 24 and only the second line portion 44 extends through the mid-portion bore 26. When molding the lure body 22, tubes may be used to create the bores out of plastic or metal. In this embodiment, a first tube 54 extends through the longitudinal axis of the lure body 22 and a second curved tube 56 lies contiguously against the first tube 54 along a forward portion of the lure body and diverges away to the side portion 22c of the lure body. The interior diameters of the first and second tubes 54 and 56 are slightly larger than the outer diameter of the first and second line portions 38 and 44, respectively, so that the lure body 22 freely slides therealong. In this embodiment the second tube 56 provides a smoothly curved conduit for the second line portion 44, as compared to the somewhat sharp corner 28 the second line portion had to slide over at the upper opening 26a of the mid-portion bore 26 where it intersected with the main bore 24 in the embodiment of FIG. 5. The smooth curve reduces the resistance the lure body 22 will experience as it slides back and forth on the second line portion 44. It is to be understood that tubes may also be used with the lure 20 shown in FIGS. 1–5.

Figure 7:
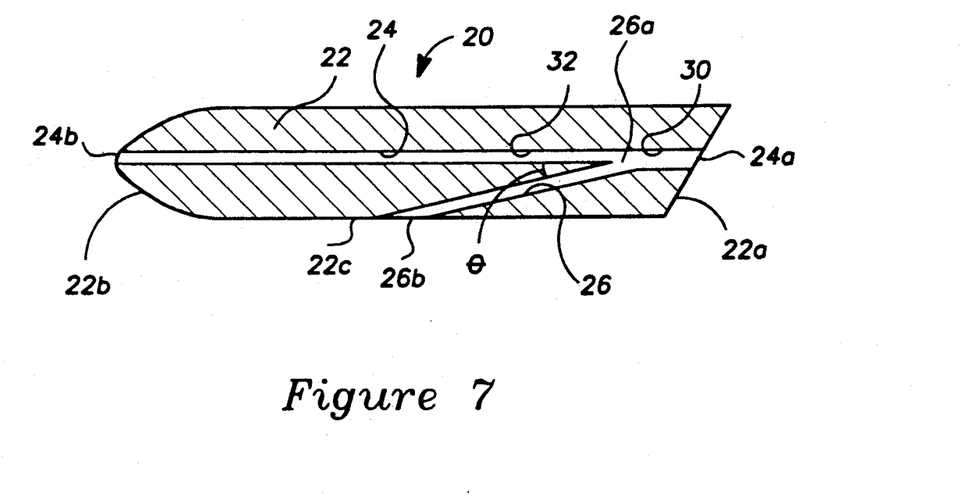
FIG. 7 is a sectional side elevation view of a second alternative embodiment of the lure of FIG. 1.

A second alternative embodiment of the lure 20 is shown in FIG. 7 which is very similar to the lure of FIGS. 1–5, except the forward bore portion 30 is shortened and the mid-portion bore 26 diverges from the main bore 24 at a smaller angle $\theta$ of approximately 15° to help reduce the resistance the lure body 22 will experience as it slides on the second line portion 44. The forward bore portion 30 is also sized larger than the rearward bore portion 32 in this embodiment.

Figure 8:
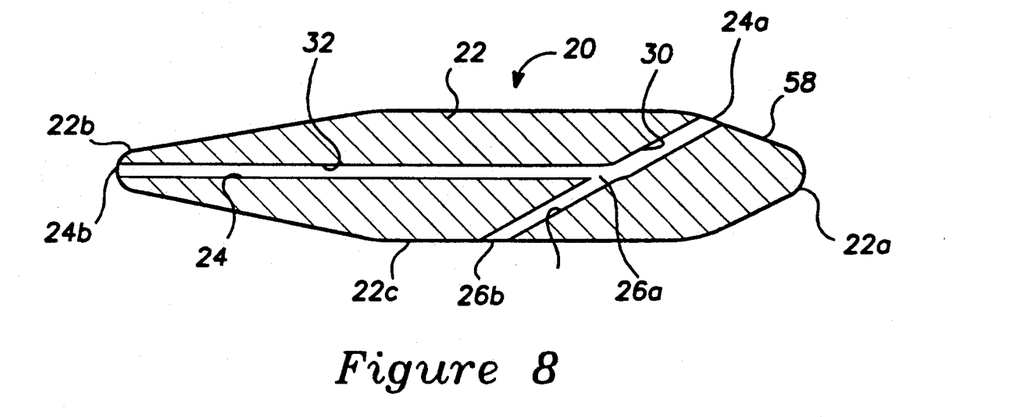
FIG. 8 is a sectional side elevation view of a third alternative embodiment of the lure of FIG. 1.
Figure 9:
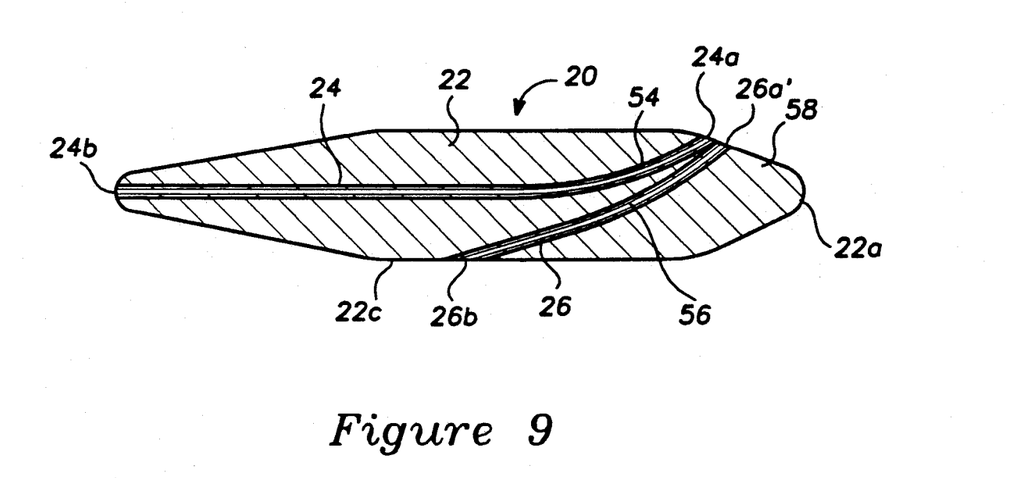
FIG. 9 is a sectional side elevation view of a fourth alternative embodiment of the lure of FIG. 1.
Figure 10:
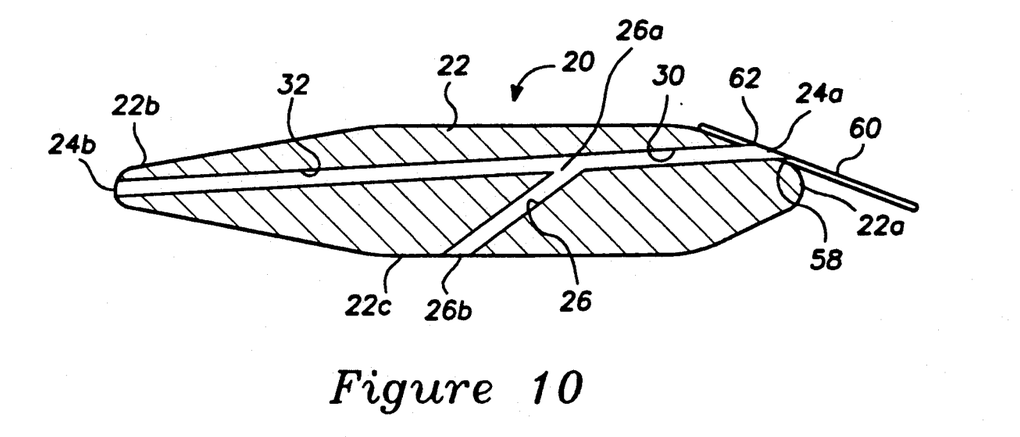
FIG. 10 is a sectional side elevation view of a fifth alternative embodiment of the lure of FIG. 1, having a diving lip.

FIGS. 8–10 show third, fourth and fifth alternative embodiments of the lure 20 of the invention constructed as a diving lure. To accomplish diving, the forward opening 24a of the main bore is moved rearward somewhat and is positioned at the upper side of the lure body 22 so that the first and second lure portions 38 and 44 exit from the lure body at a flat, forward-sloping diving surface 58 of the lure body. This allows the lure 20 to be pulled through the water with the forward end portion 22a of the lure body 22 oriented generally in a downward direction to cause the lure to dive. In the third alternative embodiment of FIG. 8, the lure 20 forward bore portion 30 slopes downwardly from the forward opening 24a until the intersection of the mid-portion bore 26 and the main bore 24. Except for its diving feature, the lure 20 of FIG. 8 has the same purpose and function as that of the lure 20 of FIGS. 1–5.

In the fourth alternative embodiment of the lure 20 shown in FIG. 9, the lure body 22 utilizes first and second tubes 54 and 56 as with the embodiment of FIG. 6, except that the forward openings 24a and 26a' of the main bore 24 and the mid-portion bore 26 are moved rearward and positioned at the upper side of the lure body at the diving surface 58.

FIG. 10 shows yet a fifth alternative embodiment of the lure 20 wherein a diving lip or plate 60 is secured to the diving surface 58. The diving plate 60 is provided to cause the lure 20 to more readily dive when pulled through the water. This embodiment has a main bore 24 and mid-portion bore 26 constructed very similar to the embodiment of FIGS. 1–5 except the main bore is not aligned with the lure body longitudinal axis. Instead, the main bore 24 slopes rearwardly downward from the forward opening 24a, located at a corresponding opening 62 in the diving plate 60, to the rearward opening 24b.

It will be appreciated that, although specific embodiments of the invention have been described herein for purposes of illustration, various modifications may be made without departing from the spirit and scope of the invention. Accordingly, the invention is not to be limited except by the appended claims.

I claim:

1. A fishing lure for use with a fishing line, comprising:

an elongated lure body having a side portion, a forward end portion, and a rearward end portion;

a main bore extending longitudinally fully through said lure body between said forward and rearward end portions, said main bore having a forward bore portion and a rearward bore portion, said forward bore portion having a forward opening at said body forward end portion and said rearward bore portion having a rearward opening at said body rearward end portion;

a mid-portion bore intersecting with said main bore at the junction of said forward and rearward bore portions, said mid-portion bore having a side opening at said body side portion;

a first flexible line portion disposed in said main bore and extending forward out of said forward opening and rearward out of said rearward opening;

a second flexible line portion disposed in said forward bore portion and said mid-portion bore and extending forward out of said forward opening and out of said side opening, said main bore being interiorly sized to permit said lure body to freely slide on said first line portion therein, said mid-portion bore being interiorly sized to permit said lure body to freely slide on said second line portion therein, and said forward bore portion being interiorly sized to permit said lure body to freely slide on both said first and second line portions therein;

a rear connector attached to an end portion of said first line portion extending out of said rearward opening;

a side connector attached to an end portion of said second line portion extending out of said side opening;

a rear hook connected to said rear connector at a position outward of said lure body;

a side hook connected to said side connector at a position outward of said lure body; and a front connector attached to end portions of both said first and second line portions extending out of said forward opening, said front connector being connectable to the fishing line such that the fishing line applies a force directly to said rear and side hooks through said first and second line portions, and said lure body is slideable forward on said first and second line portions when a fish strikes said lure body, whereby the ability to set said rear and side hooks is enhanced and said lure body easily slides forward on said first and second line portions toward said first connector and away for the fish to prevent the fish form grasping said body.

2. The fishing lure of claim 1 wherein said rear connector comprises a terminal end portion of said first line portion formed into a loop, and said side connector comprises a terminal end portion of said second line portion formed into a loop.

3. The fishing lure of claim 2 wherein said first and second line portions comprise a continuous length of line doubled back on itself to form a loop in a mid-portion thereof comprising said front connector.

4. The fishing lure of claim 3 wherein said loops are each held in place by a clasp.

5. The fishing lure of claim 4 wherein said forward opening is smaller than said clasp holding said forward connector loop in place and engagement of said lure body therewith limits forward movement of said lure body on said first and second line portions.

6. The fishing lure of claim 4 wherein said rearward opening is smaller than said clasp holding said rearward connector loop in place and engagement of said lure body therewith limits rearward movement of said lure body on said first and second line portions.

7. The fishing lure of claim 4 wherein said side opening is smaller than said clasp holding said side connector loop in place and engagement of said lure body therewith limits rearward movement of said lure body on said first and second line portions.

8. The fishing lure of claim 1 wherein said first and second line portions comprise a continuous length of lie doubled back on itself to form a loop in a mid-afternoon thereof, said loop comprising said front connector and being held fixed in place against movement along said length of line.

9. The fishing lure of claim 1 wherein said main bore extends straight between said body forward and rearward end portions.

10. The fishing lure of claim 1 wherein said mid-portion bore and said rearward bore portion diverge rearwardly.

11. The fishing lure of claim 10 wherein said mid-portion bore and said rearward bore portion define an divergence angle therebetween of no greater than 55°.

12. A fishing lure for use with a fishing line, comprising:

an elongated lure body having a side portion, a forward end portion, and a rearward end portion, said forward end portion including a diving surface;

a main bore extending longitudinally fully through said lure body between said forward and rearward end portions, said main bore having a forward bore portion and a rearward bore portion, said forward bore portion having a forward opening at said body forward end portion and said rearward bore portion having a rearward opening at said body rearward end portion;

a mid-portion bore intersecting with said main bore at the junction of said forward and rearward bore portions, said mid-portion bore having a side opening at said body side portion;

a first flexible line portion disposed in said main bore and extending forward out of said forward opening and rearward out of said rearward opening;

a second flexible line portion disposed in said forward bore portion and said mid-portion bore and extending forward out of said forward opening and out of said side opening, said main bore being interiorly sized to permit said lure body to freely slide on said first line portion therein, said mid-portion bore being interiorly sized to permit said lure body to freely slide on said second line portion therein, and said forward bore portion being interiorly sized to permit said lure body to freely slide on both said first and second line portions therein;

a rear connector attached to an end portion of said first line portion extending out of said rearward opening;

a side connector attached to an end portion of said second line portion extending out of said side opening;

a rear hook connected to said rear connector at a position outward of said lure body;

a side hook connected to said side connector at a position outward of said lure body; and a front connector attached to end portions of both said first and second line portions extending out of said forward opening, said front connector being connectable to the fishing line such that the fishing line applies a force directly to said rear and side hooks through said first and second line portions, and said lure body is slideable forward on said first and second line portions when a fish strikes said lure body, whereby the ability to set said ear and side hooks is enhanced and said lure body easily slides forward on said first and second line portions toward said first connector and away from the fish to prevent the fish from grasping said lure body.

13. The fishing lure of claim 12 wherein said main bore extends straight between said body forward and rearward end portions.

14. The fishing lure of claim 12 wherein said mid-portion bore and said rearward bore portion diverge rearwardly.

15. The fishing lure of claim 12 wherein said forward opening is located on an upper side of said lure body.

16. The fishing lure of claim 15 wherein said rearward bore portion extends longitudinally within said lure body and said forward bore portion is angled upward relative thereto.

17. The fishing lure of claim 12 wherein said main bore is angularly offset from a longitudinal axis of said lure body.

18. The fishing lure of claim 12 wherein said diving surface is formed integral with said lure body.

19. The fishing lure of claim 12 wherein said diving surface is a diving plane.

20. The fishing lure of claim 12 wherein said first and second line portions comprise a continuous length of line doubled back on itself to form a loop in a mid-portion thereof, said loop comprising said front connector and being held fixed in place against movement along said length of line.

21. A fishing lure for use with a fishing line, the lure being usable with a rear hook and a side hook, comprising:
    an elongated lure body having a side portion, a forward end portion, and a rearward end portion;
    a main bore extending longitudinally fully through said lure body between said forward and rearward end portions, said main bore having a forward bore portion and a rearward bore portion, said forward bore portion having a forward opening at said body forward end portion and said rearward bore portion having a rearward opening at said body rearward end portion;
    a mid-portion bore intersecting with said main bore at the junction of said forward and rearward bore portions, said mid-portion bore having a side opening at said body side portion;
    a first flexible line portion disposed in said main bore and extending forward out of said forward opening and rearward out of said rearward opening;
    a second flexible line portion disposed in said forward bore portion and said mid-portion bore and extending forward out of said forward opening and out of said side opening, said main bore being interiorly sized to permit said lure body to freely slide on said first line portion therein, said mid-portion bore being interiorly sized to permit said lure body to freely slide on said second line portion therein, and said forward bore portion being interiorly sized to permit said lure body to freely slide on both said first and second line portions therein;
    a rear connector attached to an end portion of said first line portion extending out of said rearward opening for connection of the rear hook thereto at a position outward of said lure body;
    a side connector attached to an end portion of said second line portion extending out of said side opening for connection of the side hook thereto at a position outward of said lure body; and
    a front connector attached to end portions of both said first and second line portions extending out of said forward opening, said front connector being connectable to the fishing line such that the fishing line applies a force directly to said rear and side hook connectors through said first and second line portions, and said lure body is slideable forward on said first and second line portions when a fish strikes said lure body.

22. The fishing lure of claim 21 wherein said main bore extends straight between said body forward and rearward end portions.

23. The fishing lure of claim 22 wherein said mid-portion bore is curved along its length to rearwardly away from said main bore.

24. The fishing lure of claim 21 further including a first tube positioned interior of said main bore, and extending between said body forward and rearward end portions, and a second tube positioned interior of said forward bore portion and said mid-portion bore, and extending between said body side portion and said body forward end portion, said first line portion being slidably disposed within said first tube and said second line portion being slidably disposed within said second tube.

25. The fishing lure of claim 21 wherein said first and second line portions comprise a continuous length of line doubled back on itself to form a loop in a mid-portion thereof, said loop comprising said front connector and being held fixed in place against movement along said length of line.

26. A fishing lure for use with a fishing line, the lure being usable with a rear hook and a side hook, comprising;
    an elongated lure body having a side portion, a forward end portion, and a rearward end portion;
    a main bore extending longitudinally fully through said lure body between said forward and rearward end portions, said main bore having a forward bore portion and a rearward bore portion, said forward bore portion having a forward opening at said body forward end portion and said rearward bore portion having a rearward opening at said body rearward end portion;
    a mid-portion bore intersecting with said main bore at the junction of said forward and rearward bore portions, said mid-portion bore having a side opening at said body side portion;
    a first elongated member moveably disposed in said main bore to permit said lure body to freely slide on said first member therein, said first member extending forward out of said forward opening and rearward out of said rearward opening;
    a second elongated member moveably disposed in said forward bore portion and said mid-portion bore to permit said lure body to freely slide on said second member therein, said second member extending forward out of said forward opening and out of said side opening;
    a rear hook connector attached to an end portion of said first member extending out of said rearward opening for connection of the rear hook thereto;
    a side hook connector attached to an end portion of said second member extending out of said side opening for connection of the side hook thereto; and a front connector attached to end portions of both said first and second members extending out of said forward opening, said front connector being connectable to the fishing line such that the fishing line applies a force directly to said rear and side hook connector portions through said first and second members, and said lure body is slideable forward on said first and second members when a fish strikes said lure body.

27. The fishing lure of claim 26 wherein said main bore extends straight between said body forward and rearward end portions.

28. The fishing lure of claim 26 wherein said mid-portion bore and said rearward bore portion diverge rearwardly.

29. The fishing lure of claim 28 wherein said mid-portion bore and said rearward bore portion define an divergence angle therebetween of no greater than 55°.

* * * * *

UNITED STATES PATENT AND TRADEMARK OFFICE
CERTIFICATE OF CORRECTION

PATENT NO. : 5,233,785
DATED : August 10, 1993
INVENTOR(S) : Edwin K.W. CHING

It is certified that error appears in the above-indentified patent and that said Letters Patent is hereby corrected as shown below:

In column 7, claim 1, line 48, please delete "for" and substitute therefor --from--.

In column 7, claim 1, line 49, please delete "form" and substitute therefor --from--.

In column 8, claim 8, line 9, please delete "lie" and substitute therefor --line--.

In column 8, claim 8, line 10, please delete "mid-afternoon" and substitute therefor --mid-portion--.

In column 9, claim 12, line 4, please delete "ear" and substitute therefor --rear--.

Signed and Sealed this

Eighth Day of November, 1994

Attest:

BRUCE LEHMAN

*Attesting Officer*     *Commissioner of Patents and Trademarks*